Patented Aug. 6, 1935

2,010,620

UNITED STATES PATENT OFFICE 2,010,620

METHOD OF PREPARING ROOFING GRANULES

Stephen G. Wright, Chicago, Ill.

No Drawing. Application December 4, 1933, Serial No. 700,937

2 Claims. (Cl. 91—70)

This invention is a method of making colored roofing granules and is an improvement on that disclosed in Patent No. 1,169,506, granted January 25, 1916, to Samuel W. Osgood.

In the Osgood process, the slag is broken into small particles in any desired manner, the preferred method being the direct introduction of molten slag into a solution of sodium silicate. This method of breaking the slag softens it and according to the patent necessitates a subsequent hardening operation. Furthermore, the method is not easily applicable to previously solidified slag.

In my improvement I crush the solidified slag to pass a 10 and be caught on a 30 mesh screen. The slag when thus crushed fractures into flaky granules which present sharp edges and which have a high ratio of surface to weight so that not only is the intensity of color greater for a given weight of material, but the adhesion to the roofing is considerably enhanced. The particles thus produced are sufficiently hard to require no hardening step.

According to the Osgood method, the slag particles are treated with powdered pigment, e. g. chromic oxide, which may be applied with the sodium silicate solution. The particles are then heated to fuse the silicate coating and thus secure the pigment permanently to the particle surface.

I find, however, that superior results are secured by treating the flakes with powdered glass, pigment and glue, the latter serving to hold the glass and pigment on the surface of the flakes until sufficient heat is supplied to fuse the glass.

As an example of the invention, one ton of slag particles was mixed with 70 pounds of glue, 70 pounds of water, 20 pounds of pigment, and 100 pounds of powdered glass. The mixture was then heated at a temperature of the order of 1500 to 1600° for a few minutes until the glass had fused and formed a glaze.

The glue may be any adhesive which does not discolor the material and which will cause the pigment and glass to adhere to the flakes until a glaze is formed and yet will not cause the slag flake to adhere to each other. For this purpose commercial liquid glue, flour, sugar, gloss oil (varnish), or sodium silicate may be used. If the glue is water immiscible, the water is replaced by a solvent for the glue. Sodium silicate is preferred for normal purposes due to its cheapness.

The glass may be powdered glass of any form which will fuse below the fusion temperature of the slag. Powdered cullet is preferred, primarily on account of its cheapness. Cullet is scrap waste glass, and therefore also generally contains high melting and low melting portions. The presence of a minor amount of a high melting glass is helpful in that it causes rough edges on the particles which aid in attaching it to the roofing material.

Any powdered pigment may be used. Chrome oxide and iron oxide are preferred.

Small amounts of non-fusible, sharp edged material may be admixed with the glass if desired in order to promote adherence of the material to the roofing base. For example, particles of fine silica may be used.

The foregoing detailed description has been given for clearness of understanding only, and no unnecessary limitations should be understood therefrom, but the appended claims should be construed as broadly as permissible, in view of the prior art.

What I claim as new, and desire to secure by Letters Patent, is:

1. The method of preparing a glazed roofing material which comprises admixing flakes of slag with a pigment, powdered glass and a glue, whereby the pigment and powdered glass adhere to the flakes, and then heating the mixture to a fusion temperature whereby the glass particles form a glaze about said flakes in which said pigment is imbedded.

2. The method as set forth in claim 1, in which the glue is sodium silicate.

STEPHEN G. WRIGHT.